United States Patent [19]
Oh

[11] Patent Number: 5,987,545
[45] Date of Patent: Nov. 16, 1999

[54] CONTROL DEVICE FOR ENABLING AND DISABLING THE DATA TRANSMISSION BETWEEN A PORTABLE COMPUTER AND A DOCKING STATION

[75] Inventor: Jae-Choeul Oh, Kyungki-do, Rep. of Korea

[73] Assignee: SamSung Electronics Co., Ltd., Kyungki-do, Rep. of Korea

[21] Appl. No.: 08/622,134

[22] Filed: Mar. 27, 1996

[30] Foreign Application Priority Data

Mar. 28, 1995 [KR] Rep. of Korea ................... 95-6760

[51] Int. Cl.⁶ .................................................. G06F 13/00
[52] U.S. Cl. ..................... 710/100; 710/101; 710/103; 710/120; 713/300
[58] Field of Search ................................ 395/280, 281, 395/300, 750, 500, 283, 800; 361/686; 342/23; 364/708.1; 359/172; 439/652

[56] References Cited

U.S. PATENT DOCUMENTS

| | | |
|---|---|---|
| 5,030,128 | 7/1991 | Herron et al. . |
| 5,126,954 | 6/1992 | Morita . |
| 5,182,698 | 1/1993 | Kobayashi et al. . |
| 5,265,238 | 11/1993 | Canova, Jr. et al. ................. 395/800 |
| 5,283,714 | 2/1994 | Tsai et al. . |
| 5,323,291 | 6/1994 | Boyle et al. . |
| 5,347,425 | 9/1994 | Herron et al. . |
| 5,371,880 | 12/1994 | Bhattacharya ........................ 713/400 |
| 5,377,357 | 12/1994 | Nishigaki et al. ..................... 395/800 |
| 5,394,552 | 2/1995 | Shirota .................................. 395/750 |
| 5,432,515 | 7/1995 | O'Conner ................................. 342/23 |
| 5,442,512 | 8/1995 | Bradbury . |
| 5,450,271 | 9/1995 | Fukushima et al. ................... 361/686 |
| 5,463,742 | 10/1995 | Kobayashi ............................. 395/281 |
| 5,491,609 | 2/1996 | Dankman et al. . |
| 5,526,493 | 6/1996 | Shu ........................................ 395/281 |
| 5,555,491 | 9/1996 | Tao ........................................ 361/686 |
| 5,581,772 | 12/1996 | Nanno et al. .......................... 395/750 |
| 5,598,537 | 1/1997 | Swanstrom et al. ................... 395/281 |
| 5,598,539 | 1/1997 | Gephardt et al. ..................... 395/281 |
| 5,621,900 | 4/1997 | Lane et al. ............................. 395/300 |
| 5,627,974 | 5/1997 | Watts, Jr. et al. ..................... 395/281 |
| 5,872,983 | 2/1999 | Walsh et al. ........................... 710/100 |

*Primary Examiner*—Ayaz R. Sheikh
*Assistant Examiner*—Eric S. Thlang
*Attorney, Agent, or Firm*—Robert E. Bushnell, Esq.

[57] ABSTRACT

A device for controlling data transmission between a docking station and a portable computer includes signal control circuitry connected to the docking station for selectively enabling and disabling data transmission between the docking station and the portable computer to enable and disable expanded operating functions of the portable computer, respectively. The signal control circuitry enables and disables the data transmission between the docking station and the portable computer in dependence upon a first signal indicating a power supply state of the docking station, a second signal indicating a power supply state of the portable computer, and a third signal indicating a connection state between the docking station and the portable computer.

9 Claims, 2 Drawing Sheets

CONTROL DEVICE FOR ENABLING AND DISABLING THE DATA TRANSMISSION BETWEEN A PORTABLE COMPUTER AND A DOCKING STATION

CROSS-REFERENCE TO RELATED APPLICATIONS

This application makes reference to, incorporates the same herein, and claims all benefits accruing under 35 U.S.C. §119 arising from an application for Control Device For A Docking Station earlier filed in the Korean Industrial Property Office on Mar. 28, 1995 and there duly assigned Ser. No. 6760/1995.

BACKGROUND OF THE INVENTION

The present invention relates to a control device for a docking station, and more particularly, to a device for controlling the transmission of data between a docking station and a portable computer based on power supply states of the docking station and the portable computer, and a connection state between the docking station and the portable computer.

Generally, a portable computer can be operated in remote locations since it uses a battery as a source of operating power. Portable computers are typically compact and easy to carry, and provide a large data processing capacity. Changes in technology, however, have placed an increased demand on portable computers to process information quickly, thereby requiring the battery of the portable computer to provide greater power capacity. The power necessary to expand the functions of the portable computer is often provided through a docking station. That is, a docking station can be used to expand the functions of a portable computer to include those functions conventionally provided from a desk top computer.

A conventional docking station for expanding the functions of a portable computer is disclosed in U. S. Pat. No. 5,283,714 entitled Docking Apparatus For A Portable Computer issued to Tsai et al. on Feb. 1, 1994. Tsai et al. '714 discloses a docking apparatus having a release mechanism that can provide a uniform force for pushing the portable computer away from the docking station so as to disengage a connector of the portable computer from a connector of the docking apparatus. While this type of conventional art provides advantages in its own right, I note that it fails to adequately address how internal components of the portable computer and the docking station can be protected from leakage currents.

SUMMARY OF THE INVENTION

Accordingly, it is an object of the present invention to provide an improved control device for a docking station that provides expanded operating functions for a portable computer.

It is another object to provide a control device for a docking station that prevents damage to the internal components of both the docking station and a portable computer.

It is still another object to provide a control device for a docking station that controls the transmission of data between the docking station and a portable computer based on power supply states of the docking station and the portable computer, and a connection state between the docking station and the portable computer.

These and other objects can be achieved in accordance with the principles of the present invention with a device for controlling data transmission between a docking station and a portable computer. The device includes signal control circuitry connected to the docking station for selectively enabling and disabling data transmission between the docking station and the portable computer to thereby enable and disable expanded operating functions of the portable computer, respectively. The signal control circuitry enables and disables the data transmission between the docking station and the portable computer in dependence upon a first signal indicating a power supply state of the docking station, a second signal indicating a power supply state of the portable computer, and a third signal indicating a connection state between the docking station and the portable computer. In particular, data transmission between the docking station and the portable computer is enabled only when the power supply states of the docking station and the portable computer are normal, and the connection state between the docking station and the portable computer is normal. Accordingly, damage to the internal components of both the docking station and the portable computer can be prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
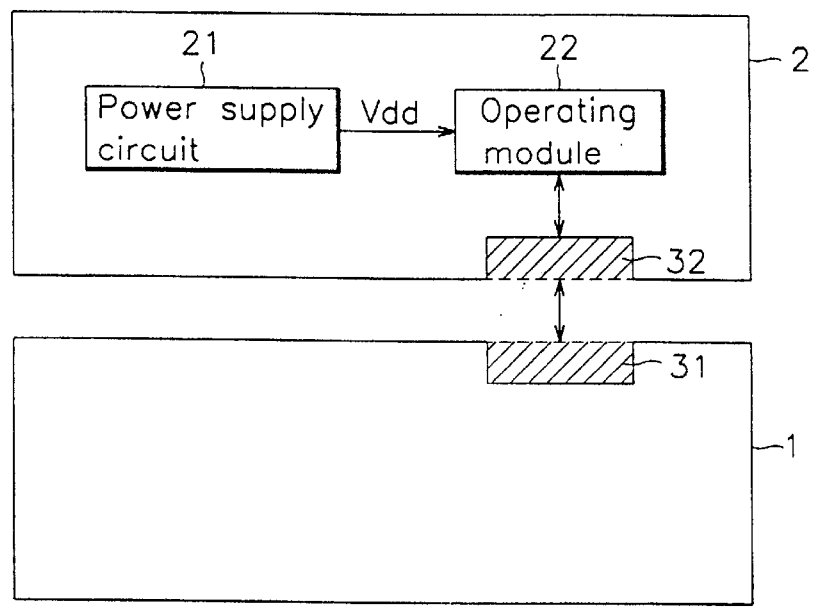
FIG. 1 is a schematic diagram providing an abstract representation of a connection between a docking station and a portable computer.

Turning now to the drawings and referring to FIG. 1, a schematic diagram providing an abstract representation of a connection between a docking station 2 and a portable computer 1 is shown. In FIG. 1, portable computer 1 can be mounted to and removed from docking station 2 by connecting and disconnecting a portable computer connector 31 to and from a docking station connector 32. Docking station 2 includes a power supply circuit 21 for providing electrical power Vdd, and an operating module 22 for controlling the supply of power to portable computer 1. Docking station 2 provides electrical power Vdd in order to expand the functions of portable computer 1 through operating module 22.

Operating module 22 performs a corresponding function after receiving an input/output control signal indicating that connectors 31 and 32 are properly connected. When expanding the functions of portable computer 1 through docking station 2, the electrical power of both docking station 2 and portable computer 1 should be in an off state when mounting and removing portable computer 1 to and from docking station 2. If portable computer 1 is mounted to or removed from docking station 2 when the electrical power of docking station 2 is in an on-state and the electrical power of portable computer 1 is in an off-state, or vice-versa, a leakage current is generated by the component whose power is in the on-state and transmitted to the component whose power is in the off-state. This leakage current can overload and damage the power supply circuit of the component whose power is in the off-state.

Figure 3:
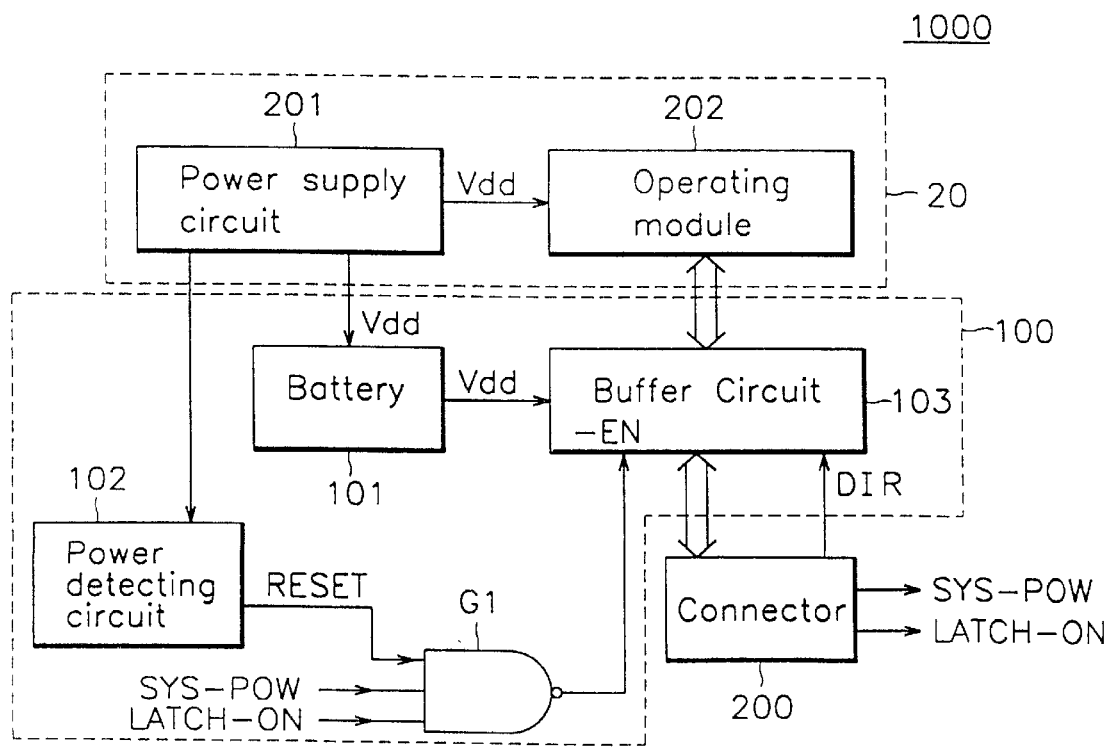
FIG. 3 is a block diagram of docking means constructed in accordance with a preferred embodiment of the present invention.
Figure 2:
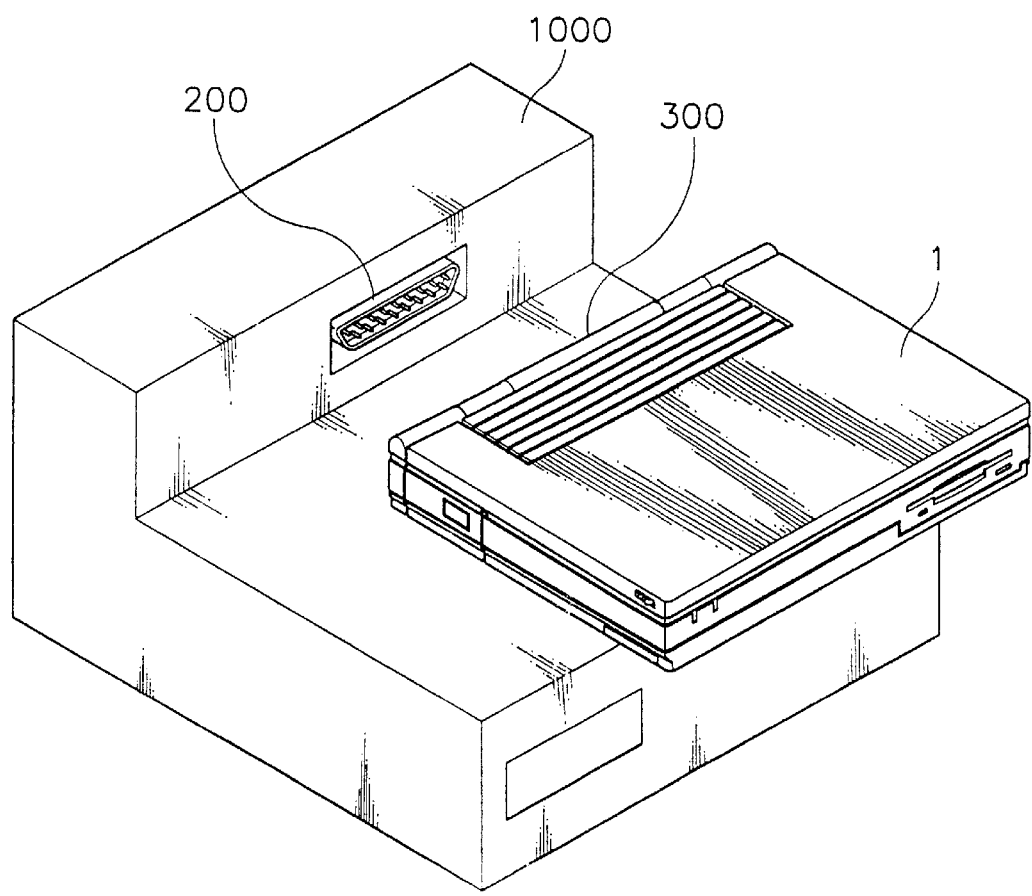
FIG. 2 is a diagram illustrating a connection between a portable computer and docking means in accordance with a preferred embodiment of the present invention.

Referring now to FIGS. 2 and 3, a preferred embodiment of the present invention will now be described in detail.

A docking means 1000 of the present invention includes: a docking station 20, a signal control means 100, and a connector 200. Docking station 20 transmits and receives corresponding data when expanding the functions of a portable computer 1. Docking station 20 includes: a power supply circuit 201 for providing electrical power Vdd needed for operations, and an operating module 202 which operates according to the electrical power Vdd provided from power supply circuit 201 and detects the transmission and reception of data while enabling performance of the function expansion operation for portable computer 1.

Signal control means 100 is connected to docking station 20, and controls the transmission and reception of data according to the electrical connection state between docking means 1000 and portable computer 1, and a power supply state of docking station 20 and portable computer 1.

Connector 200 is electrically connected to signal control means 100, and is electrically connectable to a connector 300 formed in portable computer 1. Connector 200 receives from portable computer 1, a power detection signal SYS-POW indicating whether a power supply of portable computer 1 is in the on-state, and a connection signal LATCH-ON indicating whether connector 300 of portable computer 1 is connected to connector 200 of docking means 1000.

Signal control means 100 includes a battery 101 connected to power supply circuit 201 of docking station 20 for providing electrical power Vdd needed for operation, irrespective of the operation of power supply circuit 201. A power detecting circuit 102 is connected to power supply circuit 201 of docking station 20 and variably outputs a reset signal RESET according to an operating state of power supply circuit 201. A NAND-gate G1 is connected to receive the reset signal RESET from power detecting circuit 102, and the power detection signal SYS-POW and the connection signal LATCH-ON from connector 200. A buffer circuit 103, which controls the transmission and reception of data to and from docking station 20, has an enabling port -EN for receiving an output signal from NAND-gate G1. Buffer circuit 103 also receives electrical power Vdd from battery 101, and a direction signal DIR from connector 200 indicating the direction of data flow between docking station 20 and portable computer 1.

Operation of the preferred embodiment of the present invention will now be described in detail with reference to FIGS. 2 and 3.

Electrical power Vdd of a corresponding state is output from power supply circuit 201 of docking station 20, and operating module 202 performs expanded functions of portable computer 1. Battery 101 is charged by the electrical power Vdd provided from power supply circuit 201. Accordingly, signal control means 100 can operate from the electrical power Vdd provided from battery 101. Power detecting circuit 102 determines whether or not power supply circuit 201 of docking station 20 is operating by detecting the output state of power supply circuit 201.

In a normal operating state, when electrical power Vdd is being normally and safely supplied from power supply circuit 201 of docking station 20, the reset signal RESET is output from power detecting circuit 102 in a binary high "H" state, and provided to a first input port of NAND-gate G1.

When the electrical power Vdd is in an unstable state, or is not output from power supply circuit 201 of docking station 20, the reset signal RESET is output from power detecting circuit 102 of signal control means 100 in a binary low "L" state, and is provided to the first input port of a NAND-gate G1. Power detection signal SYS-POW is provided to a second input port of NAND-gate G1, via connector 200, in a binary state according to an operating state of the power supply of portable computer 1. That is, power detection signal SYS-POW exhibits a binary high "H" state when the power supply of portable computer 1 operates normally to supply electrical power. Alternatively, when electrical power is not provided from the power supply of portable computer 1, or is provided in an unstable state, power detection signal SYS-POW exhibits a binary low "L" state.

The connection signal LATCH-ON received through connector 200 exhibits a binary state based on the connection between connector 200 of docking means 1000 and connector 300 of portable computer 1. In particular, connection signal LATCH-ON exhibits a binary high "H" state when connector 200 of docking means 1000 is properly connected to connector 300 of portable computer 1. Alternatively, connection signal LATCH-ON exhibits a binary low "L" state when connector 200 of docking means 1000 is not connected, or is not properly connected, to connector 300 of portable computer 1. Therefore, an output state of NAND-gate G1 is controlled in accordance with reset signal RESET, power detection signal SYS-POW and connection signal LATCH-ON. That is, the signal output from NAND-gate G1 exhibits a binary low "L" state when reset signal RESET, power detection signal SYS-POW and connection signal LATCH-ON all exhibit a binary high "H" state. When one or more of the reset signal RESET, power detection signal SYS-POW and connection signal LATCH-ON exhibits a binary low "L" state, however, the signal output from NAND-gate G1 exhibits a binary high "H" state.

The signal output from NAND-gate G1 is provided to the enabling port -EN of buffer circuit 103 to control an operating state of buffer circuit 103. When the signal output from NAND-gate G1 is provided to the enabling port -EN of buffer circuit 103 in a binary low "L" state, buffer circuit 103 is shifted to an enabled state. Alternatively, when the signal output from NAND-gate G1 is provided to the enabling port -EN of buffer circuit 103 in a binary high "H" state, buffer circuit 103 is shifted to a disabled state. Therefore, when buffer circuit 103, which is constructed from a tri-state buffer, is shifted to the enabled state, an operation for transmitting data between operating module 202 and portable computer 1 can be performed. On the other hand, when buffer circuit 103 is shifted to the disabled state, the operation for transmitting data between operating module 202 and portable computer 1 can not be performed because of the non-operating state of buffer circuit 103.

The direction of data flow through buffer circuit 103 is indicated in accordance with a state of the direction signal DR, which is provided by portable computer 1 as an input to a corresponding port of buffer circuit 103 through connector 200.

When expanding the functions of portable computer 1 by connecting connector 200 of docking means 1000 to connector 300 of portable computer 1, the present invention provides signal control means 100 to control the transmission of data between docking station 20 and portable computer 1. In particular, signal control means 100 enables transmission of data between docking station 20 and portable computer 1, to thereby expand the functions of portable computer 1, after the power supply states of docking station 20 and portable computer 1 are confirmed as normal and the connection between connectors 200 and 300 is properly made.

Accordingly, the present invention uses signal control means 100 to prevent a leakage current from flowing to either docking station 20 or portable computer 1 when connectors 200 and 300 are mistakenly connected by a user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A device, comprising:

signal control means operationally connected to a docking station for controlling data transmission between the docking station and a portable computer driven by a micro-processor by selectively enabling and disabling said data transmission between the docking station and the portable computer to enable and disable expanded operating functions of the portable computer, respectively, said signal control means enabling and disabling said data transmission between the docking station and the portable computer in dependence upon a first signal indicating a power supply state of the docking station, a second signal indicating a power supply state of the portable computer, and a third signal indicating a connection state between the docking station and the portable computer;

a connector interposed between said signal control means and the portable computer for connecting said signal control means to the portable computer, and providing output of said second and third signals; and said signal control means further comprising:

an electrical connection for providing operating power for said signal control means;

a power detecting circuit connected to the docking station for detecting said power supply state of said docking station, and generating said first signal exhibiting a logic state based on said power supply state of said docking station;

a NAND-gate for receiving and performing a logical NAND operation upon said first signal, said second signal and said third signal, and providing an output signal having a logic state based on said logical NAND operation; and a buffer circuit for controlling said data transmission between the docking station and the portable computer in dependence upon said logic state of said output signal provided from said NAND-gate.

2. The device of claim 1, further comprised of said buffer circuit receiving a direction signal from said connector indicating a direction of said data transmission between the docking station and the portable computer.

3. The device of claim 2, wherein said buffer circuit comprises a tri-state buffer having an enabling port connected to receive said output signal provided from said NAND-gate.

4. A device, comprising:

a buffer connected to a docking station for selectively enabling and disabling data transmission between the docking station and a portable computer to enable and disable expanded operating functions of the portable computer, respectively;

a power detecting circuit connected to the docking station for detecting a power supply state of the docking station, and generating a first signal having a logic state based on said power supply state of said docking station;

a connector interposed between said buffer and the portable computer for connecting said buffer to said portable computer, said connector providing output of a second signal having a logic state based on a power supply state of the portable computer and providing output of a third signal having a logic state based on a connection state between the docking station and the portable computer;

logic means for receiving and performing a logical operation upon said first signal, said second signal and said third signal, and providing an output signal having a logic state based on said logical operation; and said buffer enabling and disabling said data transmission between the docking station and the portable computer in dependence upon said logic state of said output signal provided from said logic means.

5. The device of claim 4, with said buffer comprising a tri-state buffer having an enabling port connected to receive said output signal provided from said logic means.

6. The device of claim 5, with said logic means comprising a NAND gate.

7. The device of claim 4, with said logic means comprising a NAND gate.

8. A method, comprising the steps of:

detecting a power supply state of a docking station, and generating a first signal exhibiting a logic state representative of said power supply state of the docking station;

detecting a power supply state of a portable computer, and generating a second signal exhibiting a logic state representative of said power supply state of the portable computer;

detecting a connection state between the docking station and the portable computer, and generating a third signal exhibiting a logic state representative of said connection state between the docking station and the portable computer;

logically combining said first signal, said second signal and said third signal to generate an output signal; and controlling data transmission between the docking station and the portable computer in dependence upon a logic state exhibited by said output signal.

9. The method of claim 8, with said step of logically combining said first signal, said second signal and said third signal comprises performing a logical NAND operation upon said first signal, said second signal and said third signal.

\* \* \* \* \*